(12) United States Patent
Powers et al.

(10) Patent No.: US 7,959,719 B2
(45) Date of Patent: Jun. 14, 2011

(54) HUMIDITY CONTROL DEVICE

(75) Inventors: Thomas H. Powers, Mayville, NY (US); Louis Patrone, Hamburg, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 267 days.

(21) Appl. No.: 12/362,253

(22) Filed: Jan. 29, 2009

(65) Prior Publication Data

US 2010/0025629 A1    Feb. 4, 2010

Related U.S. Application Data

(63) Continuation of application No. 10/984,080, filed on Nov. 9, 2004, now Pat. No. 7,501,011.

(51) Int. Cl.
*B01D 53/26* (2006.01)
*B65D 81/26* (2006.01)

(52) U.S. Cl. .............. 96/118; 96/119; 252/194

(58) Field of Classification Search .......... 96/108, 96/118, 119, 147; 252/194, 188.28; 502/405, 502/417; 206/204; 95/91
See application file for complete search history.

(56) References Cited

U.S. PATENT DOCUMENTS

| | | | |
|---|---|---|---|
| 2,752,221 A | 6/1956 | Wachter et al. | |
| 3,492,258 A | 1/1970 | Kremer | |
| 3,549,549 A | 12/1970 | Henderson | |
| 3,807,149 A * | 4/1974 | Norback | 96/118 |
| 3,833,406 A | 9/1974 | White | |
| 4,036,360 A | 7/1977 | Deffeyes | |
| 4,061,807 A | 12/1977 | Shaler et al. | |
| 4,366,179 A | 12/1982 | Nawata et al. | |
| 4,407,897 A | 10/1983 | Farrell et al. | |
| 4,552,767 A | 11/1985 | Saleeb et al. | |
| 4,730,726 A | 3/1988 | Holzwarth | |
| 4,769,175 A | 9/1988 | Inoue | |
| 4,792,484 A | 12/1988 | Moritani | |
| 4,856,650 A | 8/1989 | Inoue | |
| 4,894,277 A | 1/1990 | Akasaki | |
| 4,935,346 A | 6/1990 | Phillips et al. | |
| 4,970,172 A | 11/1990 | Kundu | |
| 5,002,792 A | 3/1991 | Vegoe | |
| 5,049,487 A | 9/1991 | Phillips et al. | |
| 5,078,909 A | 1/1992 | Shigeta et al. | |
| 5,108,706 A | 4/1992 | Saggiorato | |
| 5,147,698 A | 9/1992 | Cole | |
| 5,207,943 A | 5/1993 | Cullen at al. | |
| 5,238,652 A | 8/1993 | Sun et al. | |
| 5,262,375 A * | 11/1993 | McKedy | 502/406 |
| 5,286,407 A | 2/1994 | Inoue et al. | |
| 5,304,419 A | 4/1994 | Shores | |
| 5,304,468 A | 4/1994 | Phillips et al. | |
| 5,432,214 A | 7/1995 | Lancesseur | |
| 5,460,777 A | 10/1995 | Kitajima et al. | |
| 5,500,470 A | 3/1996 | Mirle et al. | |
| 5,503,662 A | 4/1996 | Berger | |
| 5,516,390 A | 5/1996 | Tomita et al. | |
| 5,597,884 A | 1/1997 | Bender | |
| 5,641,088 A | 6/1997 | Berger | |
| 5,641,425 A | 6/1997 | McKedy et al. | |
| 5,667,863 A | 9/1997 | Cullen et al. | |
| 5,684,094 A | 11/1997 | Suzuki et al. | |
| 5,686,161 A | 11/1997 | Cullen et al. | |
| 5,746,937 A | 5/1998 | McKedy et al. | |
| 5,773,105 A | 6/1998 | Klett | |
| 5,801,220 A | 9/1998 | Desai et al. | |
| 5,816,438 A | 10/1998 | Berger et al. | |
| 5,824,140 A | 10/1998 | Berger | |
| 5,833,784 A | 11/1998 | Berger | |
| 5,839,593 A | 11/1998 | McKedy et al. | |
| 5,879,490 A | 3/1999 | Berger | |
| 5,889,093 A | 3/1999 | Hatakeyama et al. | |
| 5,942,060 A * | 8/1999 | Berger | 156/69 |
| 5,962,333 A | 10/1999 | Incorvia et al. | |
| 6,133,361 A | 10/2000 | Hatakeyama et al. | |
| 6,139,935 A | 10/2000 | Cullen et al. | |
| 6,156,231 A | 12/2000 | McKedy | |
| 6,167,720 B1 | 1/2001 | Chisnell | |

(Continued)

FOREIGN PATENT DOCUMENTS

CN        1487826 A        4/2004

(Continued)

OTHER PUBLICATIONS

Korean Intellectual Property Office Notice of Preliminary Rejection dated May 20, 2010, 25 pages, English translation, 5 pages.

(Continued)

*Primary Examiner* — Frank M Lawrence
(74) *Attorney, Agent, or Firm* — Stephen B. Salai, Esq.; Jodi A. Reynolds, Esq.; Harter Secrest & Emery LLP

(57) ABSTRACT

A device for controlling relative humidity in an environment with a solidified humectant composition. The solidified humectant composition is made from a humectant salt, water, and a carrier. The solidified humectant may be formed into a tablet with the aid of a binder, or it may be contained within a thermoformed felt material, a sachet, or a water permeable canister. In a preferred embodiment, the sachet is made of a micro-perforated polyester/paper/polyethylene material. Preferred humectant salts include $CaCl_2$, $K_2CO_3$, LiCl, NaCl, $K_2SO_4$, and combinations thereof. A preferred embodiment of the present invention includes the use of one or more of: an antimicrobial agent, activated carbon, a volatile organic, a moisture adsorber and an oxygen absorber, in combination with the solidified humectant salt.

26 Claims, No Drawings

U.S. PATENT DOCUMENTS

| | | |
|---|---|---|
| 6,209,289 B1 | 4/2001 | Cullen et al. |
| 6,248,690 B1 | 6/2001 | McKedy |
| 6,318,115 B1 | 11/2001 | Kirchner et al. |
| 6,436,872 B2 | 8/2002 | McKedy |
| 6,457,294 B1 | 10/2002 | Virnelson et al. |
| 6,460,271 B2 | 10/2002 | Hekal |
| 6,465,532 B1 | 10/2002 | Hekal et al. |
| 6,506,233 B2 | 1/2003 | Smith |
| 6,540,937 B1 | 4/2003 | Payne et al. |
| 6,558,571 B1 | 5/2003 | Powers |
| 6,562,452 B2 | 5/2003 | Ferri |
| 6,569,532 B2 | 5/2003 | Tomiyoshi et al. |
| 6,571,942 B2 | 6/2003 | Riemenschneider et al. |
| 6,596,191 B2 | 7/2003 | Sakamoto et al. |
| 6,613,405 B1 | 9/2003 | Hekal |
| 6,649,086 B2 | 11/2003 | Payne et al. |
| 6,652,775 B2 | 11/2003 | Ahn et al. |
| 6,667,273 B1 | 12/2003 | Cullen et al. |
| 6,688,468 B2 | 2/2004 | Waterman |
| 6,705,463 B1 | 3/2004 | Bucholtz et al. |
| 6,767,521 B1 | 7/2004 | Vogt et al. |
| 6,769,558 B1 | 8/2004 | Bucholtz |
| 6,796,423 B2 * | 9/2004 | Miller ............................ 206/204 |
| 7,501,011 B2 | 3/2009 | Powers et al. |
| 2001/0023232 A1 | 9/2001 | McKedy |
| 2001/0048096 A1 | 12/2001 | Sakamoto et al. |
| 2002/0014305 A1 | 2/2002 | Dick et al. |
| 2002/0132359 A1 | 9/2002 | Waterman |
| 2003/0042166 A1 | 3/2003 | Waterman |
| 2003/0194516 A1 | 10/2003 | Payne et al. |
| 2005/0072985 A1 | 4/2005 | Powers |

FOREIGN PATENT DOCUMENTS

| | | |
|---|---|---|
| EP | 0387604 A1 | 9/1990 |
| EP | 400460 | 12/1990 |
| EP | 432438 | 6/1991 |
| EP | 0449267 A1 | 10/1991 |
| EP | 0387604 B1 | 6/1993 |
| EP | 0864630 B1 | 9/1998 |
| EP | 1000873 B1 | 11/2003 |
| EP | 0892673 B1 | 2/2004 |
| GB | 579094 A | 7/1946 |
| JP | 59-026475 | 2/1984 |
| WO | 92/12004 | 7/1992 |
| WO | 96/29603 | 9/1996 |
| WO | 97/32663 | 9/1997 |
| WO | 02/50178 A1 | 6/2002 |
| WO | 03/013843 A1 | 2/2003 |
| WO | 03/016037 A1 | 2/2003 |
| WO | 03/086900 A1 | 10/2003 |
| WO | 04/000703 A1 | 12/2003 |
| WO | 2004/033320 A2 | 4/2004 |
| WO | 2004/033339 A1 | 4/2004 |
| WO | 2004/034024 A2 | 4/2004 |

OTHER PUBLICATIONS

Chinese Patent Office, Office Action dated Jun. 9, 2010, 24 pages, English translation, 8 pages.

European Patent Office, Supplementary Search Report dated Sep. 1, 2010, 6 pages.

Office Action dated Mar. 25, 2008 for U.S. Appl. No. 10/984,080.

PCT/US05/39999 International Search Report and Written Opinion dated Jul. 8, 2008.

Australian Examiner's Report dated Dec. 8, 2008, 2 pages.

Chaplin, Martin, Carboxymethylcellulose, Water Structure and Science, dated Oct. 17, 2008, 2 pages.

Luther, Brian, White Rot vs. Brown Rot, and how to Distinguish Them, Spore Prints, Bulletin of The Puget Sound Mycological Society, Jan. 2007, pp. 5-6.

Australian Examiner's First Report dated Oct. 5, 2007. 2 pages.

Canadian Intellectual Property Office Official Action dated Jun. 20, 2009, 4 pages.

U.S. Appl. No. 12/180,983, filed Jul. 28, 2008, Humidity Control for Produce in a Refrigerator, 13 pages.

Letter from Chinese Patent Agent dated Feb. 18, 2011 (including English Translation of Text of Second Office Action (6 pages).

Letter from Chinese Patent Agent dated Jun. 28, 2010 (including English Translation of Text of Office Action (10 pages).

* cited by examiner

HUMIDITY CONTROL DEVICE

CROSS REFERENCE TO RELATED APPLICATIONS

This application is a continuation application of U.S. application Ser. No. 10/984,080, filed on Nov. 9, 2004, the entire disclosure of which is incorporated herein by reference.

FIELD OF THE INVENTION

The present invention relates to humidity control, and more particularly to humidity control devices that can be used in a defined environment to maintain humidity at a desired level.

BACKGROUND OF THE INVENTION

Traditionally, deliquescent compounds, usually salts, are used to reduce relative humidity in a closed environment. It is well known that different compounds have varying affinity for moisture. For example, each deliquescent compound has a characteristic capacity for moisture adsorption and a characteristic equilibrium relative humidity (ERH) when hydrated.

Desiccants can be considered humidity controllers in that they have been used to completely (or almost completely) remove all water vapor from the air from a closed system. An effective desiccant in sufficient quantity will adsorb water vapor from the air in a package, lowering the equilibrium relative humidity (ERH) to the point where condensation will no longer occur, or to a point where the threshold ERH within a sealed package or system is never exceeded under the conditions to which the package or system will be exposed. A larger quantity of an effective desiccant will reduce water vapor in a closed system well below the dew point to where the relative humidity of the system matches the ERH of the desiccant at its current degree of hydration.

However, there are applications (food, pharmaceutical, analytical, medical diagnostics, to name a few) where a desiccant is not the best alternative. In such cases, ERH of the product must be maintained at some specific intermediate level, rather than near zero. A common and economical method of controlling humidity in moist environments is the use of humectant compounds. Inorganic salts are the most effective and are most often used, although many deliquescent or hydratable compounds can be used in an appropriate system. These compounds have an affinity for water that regulates the water vapor pressure in the atmosphere within a closed vessel or chamber. In essence, such compounds will adsorb moisture until they go completely into solution. As this occurs, a mixture of solid salt and salt solution will coexist. This solution will be saturated and will have an ERH characteristic of the particular salt or compound used.

The specific humectant in such cases is chosen based on the desired equilibrium relative humidity (ERH). The salt may be single in nature, such as lithium chloride. A mixture of two salts may also be used. As an example, a solution of potassium carbonate has a relative humidity of about 43%. Therefore, a solution of potassium carbonate with excess undissolved crystals of potassium carbonate will maintain a constant relative humidity of approximately 43%. If the relative humidity begins to rise above 43%, the salt solution would pick up moisture from the environment thus lowering the relative humidity closer to 43%. Conversely, if the relative humidity begins to fall below 43%, the solution would release moisture until the surrounding environment reaches approximately 43%. The ERH values for different saturated aqueous salt solutions can vary from 11% to 98%.

Other inventions for humidity control devices describe a viscous solution contained within a fabric or non-woven polymeric pouch. The viscous solution in such cases has included water, salt, and may have had a thickening material (such as alginate or xanthan gum). In practice, these salt solutions were difficult to handle because they are liquids which can spill or soak through the package or vessel containing them. Even a stabilized salt solution can weep or wick out of a package which must of necessity be porous to water vapor in order to function. Compounding this problem is the fact that the tendency to weep becomes greater as the humectant attracts moisture from its environment and becomes more fluid. With a fluid, even a thickened fluid, seepage may occur through a package if the moisture permeation rate of the film or pouch is too great, or if the surface energy or "wettability" is too high. This would obviously be counterproductive to the desired goal of protecting a product.

SUMMARY OF THE INVENTION

The present invention comprises a device for controlling relative humidity in an enclosed or defined environment. The invention includes a solidified humectant composition comprised of a humectant salt, water, and a carrier. A preferred embodiment has the composition in a tablet form which may include the use of a binder that could be different from the carrier. A preferred tablet form embodiment has the tablet coated for durability. Appropriate coatings would include polyethylene or other thermoplastic resins, polytetrafluoroethylene, polyvinylpyrollidone and cellulose ethers.

The present invention also provides a device for controlling relative humidity in a closed environment or product package comprising a water vapor-permeable container housing a stabilized or solidified humectant composition within the container. The solidified humectant composition comprises a humectant salt, water, and a carrier. The preferred container materials include a thermoformed felt material, a sachet, a water vapor-permeable canister or a plastic body which may be sealed except for a "breather" port or closed with a breathable film or membrane. In a preferred embodiment, the sachet is comprised of a micro-perforated polyester/paper/polyethylene material. Preferred humectant salts include $CaCl_2$, LiCl, $K_2CO_3$, NaCl, $K_2SO_4$, and combinations thereof. A preferred embodiment of the present invention includes the use of an antimicrobial agent in the container.

Preferred embodiments of the above would also include specific additional elements to the composition which would make the device multifunctional. Examples of this would be the inclusion of activated carbon to control volatiles and/or an oxygen absorber.

DETAILED DESCRIPTION OF THE INVENTION

The present invention provides a humectant in a generally solid form to eliminate the possibility of leakage, spillage or seepage of the humectant and resultant damage to the product or materials the humectant is designed to protect. This invention provides a stable, solid-form material, free-standing or in a vapor-permeable container for controlling relative humidity in a closed system such that the product or materials held within the package are protected and not degraded, denatured, or soiled in any manner.

This is accomplished by stabilizing or solidifying the saturated humectant to provide a packaged humidity control device that will not seep water, solution or the humectant itself. Use of a solid humectant compound controls a closed environment at a desired humidity and below the dew point as well, preventing the possibility of condensation.

Another aspect of the present invention is to provide additional functionality to the solid state, moisture regulation system. As an example, a basic salt may function as a humectant and also function to neutralize volatile acids that may exist within a package, or which may evolve from the product within the package. It can be appreciated that salts may simultaneously function to regulate moisture within a system and buffer the system, or provide a reducing environment in which oxygen is scavenged from a closed system.

In an exemplary embodiment of the present invention, the solidified form containing the humectant salt may also include an antimicrobial preservative which will control growth of microorganisms within the humectant package. Further, by choosing an antimicrobial agent that has some volatility and is compatible with the container, vessel, chamber, or package and its contents, the entire closed system can be protected from microbiological degradation.

The humectant compound or salt solution in accordance with the present invention is preferably prepared at a predetermined solution temperature by introducing distilled water slowly to a specific salt with constant stirring. The solution should visually appear to be "slush-like," which reflects the presence of excess salt crystals that are undissolved. Careful preparation of the salt solution is necessary, as this dictates accurate attainment of the anticipated and desired humidity level.

Alternatively, a true solution may be prepared and solidified or impregnated into a solid carrier phase and then partially dried to the point of supersaturation at which point excess salt may be expected to precipitate out leaving a saturated solution with excess salt. The proportion of excess salt to saturated solution will determine the amount of moisture which may be adsorbed or released within a given system in its functional humidity range. Where the service environment is expected to be higher in humidity than the ERH of the humectant, it may be desired to completely dry the impregnated or solidified humectant to maximize adsorption capability.

A preferred embodiment of the present invention includes an antimicrobial agent within the container. Preferably, the antimicrobial agent is added to the humectant salt solution. This is a preferred embodiment because microbial growth, most commonly mold, can be a factor contributing to degradation of many moist packaged products.

As noted above, the humectant salts of the present invention are present in the form of saturated solutions. The solution is then solidified (stabilized) by adding it to a carrier medium. The carrier may be a cellulose, silica gel, clay, carbon, carbohydrate or protein gelling agent, hydrocolloid like carrageenan or alginate, gum like konjac, hydrophilic polymer like acrylate or polyvinyl alcohol, or any other material that will stabilize, solidify, encapsulate or adsorb the humectant in a solid state. This solid-form humectant may then be sealed into a suitable container in accordance with the invention and used in a package without danger to the contents of the package.

In a preferred embodiment of the present invention, a packaged, hydrocolloid-solidified humectant is contained within a felt envelop, the combination of which is placed into a closed environment housing a moisture sensitive analytical reagent. A preferred single salt is potassium sulfate, as a solution of potassium sulfate can provide an ERH of approximately 98% (at temperatures under 20° C.). In this case the humectant serves as a moisture source while maintaining a non-condensing atmosphere within the sealed chamber. Packaging a water/acrylate mixture in felt can similarly provide a constant moisture source. However, in this latter case there is no salt to keep the relative humidity below the dew point of the package housing interior and therefore condensation is likely to occur as temperatures change.

As noted above, the solidified humectant may be contained within a vapor permeable container designed to be compatible with the sealed system package for which humidity control is desired. The container interface must allow for sufficient moisture permeability between the solidified humectant and the product and its environment within the package, while securely containing the solidified humectant. Typical containers can take the form of thermoformed felt material, a canister or perforated rigid or semi-rigid vessel, or a sachet made with a micro-perforated polyester/paper/polyethylene structure or a woven or non-woven material.

In an alternative preferred embodiment of the present invention, the solidified humectant can be formed into a tablet through the inclusion of an appropriate binder in the composition. The binder could be a separate element in addition to a carrier noted above. For example, the carrier could be silica gel, and the binder could be any of a known number of binders, such as polyvinylpyrrolidone, a cellulose ether resin, a thermoplastic polymer or a wax. Alternatively, the binder could serve also as the carrier if present in adequate amounts to stabilize and solidify the humectant salt.

This tableted humectant can be used as is without further packaging, or it may be contained. It could be contained as noted above, or coated with a vapor permeable coating for added durability (as compared to just using the tableted humectant). In such a case where a coating is desired, the tablet can be coated with a suitable water vapor permeable coating. Appropriate such coatings would include powdered polymers such as polyethylene or polytetrafluoroethylene, coated dry or in suspension followed by heat curing. Alternatively, the tableted humectant could be resin coated such as with polyvinylpyrrolidone or a cellulose ether followed again by a drying and curing step.

The tableted humectant may be designed to only control humidity, or it may be designed to be multifunctional such as the volatile acid adsorption tablet of Example 6, below, which contains both activated carbon and silica gel in addition to a humectant salt. For example, if the salt is present with silica gel and activated carbon, all within a binder, the humectant salt can neutralize an acid detrimentally present in the environment which would then be adsorbed by the activated carbon.

Another example is shown in example 7 which illustrates an embodiment that contains carbon alone for hydrocarbon or other volatile organic compounds (VOC's) adsorption, with a humectant salt for humidity control.

This multifunctionality could be further achieved by the introduction of an oxygen absorber contained within the solidified composition. In such a case, the humectant/water/carrier/binder combination could include iron or ascorbic acid or other reducing compound. These selections of ingredients can be made by one skilled in the art with the benefit of this disclosure without undue experimentation.

EXAMPLES

Example 1

A solidified humectant composition was prepared by adding 100 grams of distilled water to 20 grams of potassium sulfate with constant stirring. This mixture was combined with 15 grams of carrageenan. The mixture was found to have an ERH of 98%.

Example 2

A solidified humectant composition was prepared by adding 0.1 grams of ProClin 300 antimicrobial to 100 grams of distilled water (ProClin is a registered trademark of Rohm and Haas Company for preservatives used in the manufacture of biological, chemical, diagnostic and laboratory reagents). Next, this solution was introduced to 20 grams of potassium sulfate with constant stirring. This mixture was combined with 15 grams of carrageenan. The mixture was eventually found to have an ERH of 98%. This mixture resulted in a stiff gel which was wrapped and sealed in polyester felt. The resultant structure could be deformed with hand pressure but could not be made to leak with any amount of manual handling.

Example 3

A solidified humectant container was prepared by first adding 0.4 grams of sodium propionate to 50 grams of distilled water. Next, this solution was introduced to 58 grams of potassium carbonate with constant stirring. This mixture was then combined with wide pore silica gel in the ratio of 75:25 (weight percent gel:weight percent solution). The resulting granular solid humectant was packaged in a non-woven HDPE sachet. The mixture was eventually found to have an ERH of approximately 44%.

This humectant container absorbs 25% of its weight in moisture in a moist environment and will supply 10% of its weight in moisture in a dry environment. Within these limits the relative humidity within a closed environment remains close to 44%.

Example 4

A solidified humectant container was prepared by separately adding 1 part 50% (w/w) $CaCl_2$ solution and 1 part 50% (w/w) $K_2CO_3$ solution to two parts by weight silica gel (U.S.P. grade). The solutions were fully adsorbed within 24 hours and then dried to about 2% moisture. The completed, dried granular humectant was packaged in a welded non-woven sachet.

This humectant container was found to have an ERH of 18.1%, a moisture adsorption capacity at 29% r.h. of 5.5% and an acid absorption capacity of at least 0.5 meq/g.

This product was effective in protecting and maintaining active a chemiluminescent medical diagnostic device over an extended storage period of 12 months.

Example 5

A saturated NaCl solution was impregnated into an equal weight of wide pore silica gel. Solid ascorbic acid and sodium ascorbate were added, each at ⅓ the weight of the solidified humectant. Iron powder in an amount equal to the total of humectant and solid acid and salt was then added and the combined granular and powdered mixture was packaged in a microperforated sachet.

The ERH of the solidified humectant was 56%. This relative humidity was maintained while oxygen was removed from a pharmaceutical package. The resulting atmosphere provided extended stability for an active pharmaceutical tablet.

Example 6

A potassium carbonate solution was added to granular activated carbon mixed with granular silica gel such that there was 2.5% potassium carbonate on a dry basis. A binder resin of polyvinylpyrollidone was added and after the mixture was partially dried to an optimum point of about 16% moisture, the mixture was pressed into a tablet form. The tablet was heat cured and allowed to rehydrate to an ERH of about 25%. The uncoated, uncontained tablet, within a closed housing, had the capability of adsorbing moisture while keeping the ERH within the housing below 44%. The tablet also absorbed and neutralized volatile acids, thereby protecting a delicate electronic component also contained in the housing. In this example no coating was applied to the tablet.

Example 7

A tablet was made with carbon impregnated with a LiCl solution and then dried in order to enhance moisture adsorption and low humidity performance. The tablet needed to be strong so a PE binder was used, which gave good strength.

The steps to make this tablet were:
1. Mix 142.6 gms LiCl, with 440 gms of $H_2O$ and mix for 1 hr.
2. Add 1960 gms of dry low activity carbon and 490 gms high activity carbon into "V" Blender.
3. Impregnate carbon with salt solution in "V" blender for 4.0 minutes.
4. Dry carbon in oven for 16 hrs at 110° C.
5. Place carbon into "V" Blender and add 457.5 gms of PE and mix for 4 minutes.
6. Run on tablet press and cure parts at 110° C. for 1 hr.
7. Tablet Formula:
    Low activity carbon=64.2%
    High activity carbon=16.1%
    $LiCl_2$ salt=4.7% (5.5% on carbon)
    PE binder=15.0%

Results:

The tablet was tested in a humidity chamber at 90% RH and 29° C. to capacity. The tablet picked up 40% $H_2O$ based on total tablet weight and exhibited 47% pickup based on carbon mass.

Although the invention has been illustrated and described herein with reference to specific embodiments, the invention is not intended to be limited to the details shown. Rather, various modifications may be made in the details within the scope and range of equivalents of the claims and without departing from the invention. Numerous variations, changes and substitutions will occur to those skilled in the art without departing from the spirit of the invention. Accordingly, it is intended that the appended claims cover all such variations as fall within the spirit and scope of the invention.

What is claimed:

1. A device for adsorbing and releasing moisture to produce and maintain a desired equilibrium relative humidity in an environment comprising:
    a carrier in a continuous solid phase, the carrier including;
    a water adsorbed into the carrier; and
    a humectant salt having a portion dissolved in the water forming a saturated solution and an excess portion in solid form, the humectant salt and the carrier selected such that the combination produces the desired equilibrium relative humidity, wherein the device maintains the desired equilibrium relative humidity by changing the ratio of the dissolved portion of humectant salt to excess portion of humectant salt and wherein at least some excess portion always remains.

2. The device of claim 1 further comprising a binder which is different from the carrier.

3. The device of claim 2 wherein the device is in a tablet form.

4. The device of claim 3 wherein the tablet is coated with a water-vapor permeable coating.

5. The device of claim 4 wherein the coating is selected from the group consisting of polyethylene, polytetrafluoroethylene, polyvinylprollidone and cellulose ether.

6. The device of claim 1 wherein the humectant salt is selected from the group consisting of $CaCl_2$, $K_2CO_3$, NaCl, $K_2So_4$, LiCl and combinations thereof.

7. The device of claim 1 further comprising an antimicrobial agent.

8. The device of claim 1 wherein the carrier is selected from the group consisting of cellulose, silica gel, clay, carbohydrate or protein gelling agent, hydrocolloid gum, and hydrophilic polymers.

9. The device of claim 1 further comprising activated carbon.

10. The device of claim 1 further comprising an oxygen absorber.

11. The device of claim 2 wherein the binder is selected from the group consisting of polyvinylprollidone, a thermoplastic resin, a wax, and combinations thereof.

12. A device for adsorbing and releasing moisture to produce and maintain a desired equilibrium relative humidity in an environment comprising:
a water vapor-permeable container; and
a solidified humectant composition within the container, the solidified humectant composition comprising:
a carrier in a continuous solid phase, the carrier including;
a water adsorbed into the carrier;
a humectant salt having a portion dissolved in the water forming a saturated solution and an excess portion of humectant salt in solid form, the humectant salt and the carrier selected such that the combination produces the desired equilibrium relative humidity, wherein the device maintains the desired equilibrium relative humidity by changing the ratio of the dissolved portion of humectant salt to excess portion of humectant salt and wherein at least some of the excess portion of humectant salt always remains.

13. The device of claim 12 wherein the container is comprised of a thermoformed felt material.

14. The device of claim 12 wherein the container is in the form of a sachet.

15. The device of claim 12 wherein the container is in the form of a canister.

16. The device of claim 14 wherein the sachet is comprised of micro-perforated polyester/paper/polyethylene material.

17. The device of claim 15 wherein the canister is perforated or is made partially or completely of a microporous sintered material.

18. The device of claim 12 wherein the humectant salt is selected from the group consisting of $CaCl_2$, $K_2CO_3$, LiCl, NaCl, $K_2SO_4$, and combinations thereof.

19. The device of claim 12 further comprising an antimicrobial agent in the container.

20. The device of claim 12 wherein the carrier is selected from the group consisting of cellulose, silica gel, clay, carbohydrate or protein gelling agent, hydrocolloid gum, and hydrophilic polymers.

21. The device of claim 12 wherein the solidified humectant composition further comprises activated carbon.

22. The device of claim 12 wherein the solidified humectant composition further comprises an oxygen absorber.

23. The device of claim 12 wherein the container comprises a sealed body having a breather port thereon.

24. The device of claim 2 wherein the binder is selected from the group consisting of polyvinylpyrollidone, a thermoplastic resin, a wax, and combinations thereof and wherein the carrier is selected from the group consisting of cellulose, silica gel, clay, carbohydrate or protein gelling agent, hydrocolloid gum, and hydrophilic polymers.

25. The device of claim 1 wherein the carrier is selected from the group consisting of materials that will stabilize, solidify, encapsulate or absorb the humectant in a solid state.

26. The device of claim 12 wherein the carrier is selected from the group consisting of materials that will stabilize, solidify, encapsulate or absorb the humectant in a solid state.

* * * * *